(12) United States Patent
Palmer

(10) Patent No.: US 10,878,722 B2
(45) Date of Patent: Dec. 29, 2020

(54) EDUCATIONAL SYSTEM, METHOD, AND APPARATUS

(71) Applicant: Gavin Palmer, Jamaica, NY (US)

(72) Inventor: Gavin Palmer, Jamaica, NY (US)

( * ) Notice: Subject to any disclaimer, the term of this patent is extended or adjusted under 35 U.S.C. 154(b) by 287 days.

(21) Appl. No.: 15/900,875

(22) Filed: Feb. 21, 2018

(65) Prior Publication Data

US 2019/0206280 A1    Jul. 4, 2019

Related U.S. Application Data

(60) Provisional application No. 62/613,264, filed on Jan. 3, 2018.

(51) Int. Cl.

| | |
|---|---|
| *G09B 23/04* | (2006.01) |
| *G09B 5/12* | (2006.01) |
| *G09B 9/00* | (2006.01) |
| *G09B 19/00* | (2006.01) |
| *G09B 19/02* | (2006.01) |
| *G09B 1/38* | (2006.01) |
| *A63H 33/04* | (2006.01) |
| *G09B 5/02* | (2006.01) |
| *A63H 33/14* | (2006.01) |
| *A63H 33/06* | (2006.01) |
| *A63H 33/08* | (2006.01) |
| *A63H 33/10* | (2006.01) |

(52) U.S. Cl.
CPC ............ *G09B 23/04* (2013.01); *A63H 33/046* (2013.01); *G09B 1/38* (2013.01); *G09B 5/02* (2013.01); *G09B 5/12* (2013.01); *G09B 5/125* (2013.01); *G09B 9/00* (2013.01); *G09B 19/0069* (2013.01); *G09B 19/02* (2013.01); *G09B 19/025* (2013.01); *A63H 33/048* (2013.01); *A63H 33/062* (2013.01); *A63H 33/067* (2013.01); *A63H 33/08* (2013.01); *A63H 33/107* (2013.01); *A63H 33/14* (2013.01)

(58) Field of Classification Search
CPC . G09B 23/04; G09B 1/38; G09B 5/02; G09B 5/12; G09B 5/125; G09B 9/00; G09B 19/00; G09B 19/0069; G09B 19/02; G09B 19/025; G09B 5/00; A63H 33/046; A63H 33/048; A63H 33/062; A63H 33/067; A63H 33/08; A63H 33/107; A63H 33/14

See application file for complete search history.

(56) References Cited

U.S. PATENT DOCUMENTS

| | | | |
|---|---|---|---|
| 2013/0140771 A1* | 6/2013 | Bullock | A63F 3/0052 273/271 |
| 2014/0227934 A1* | 8/2014 | Rudisill | A63H 33/046 446/92 |

* cited by examiner

*Primary Examiner* — Timothy A Musselman
(74) *Attorney, Agent, or Firm* — Ellenoff Grossman & Schole LLP; James M. Smedley; Alex Korona

(57) ABSTRACT

An educational apparatus is disclosed. The educational apparatus has one or more first sheet members including a first side and a second side, the first side and the second side each having first markings indicating the same first surface area, and one or more first attachment portions disposed along some or substantially all of a perimeter of the one or more first sheet members. The educational apparatus also has one or more second sheet members including a first side and a second side, the first side and the second side each having second markings indicating the same second surface area, and one or more second attachment portions disposed along some or substantially all of a perimeter of the one or more second sheet members.

20 Claims, 11 Drawing Sheets

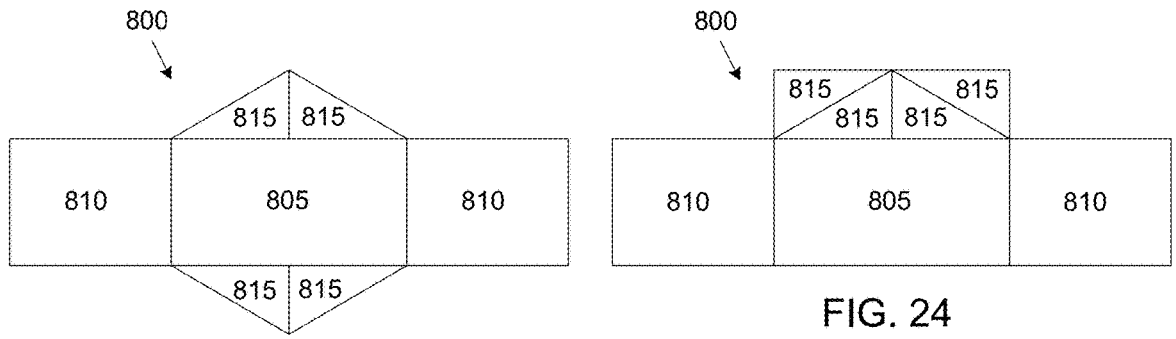
FIG. 23
FIG. 24
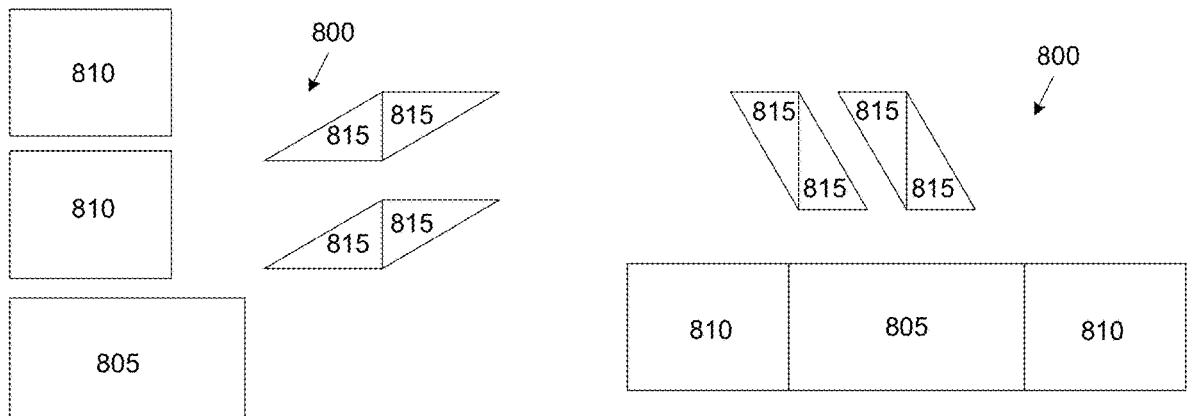
FIG. 25
FIG. 26
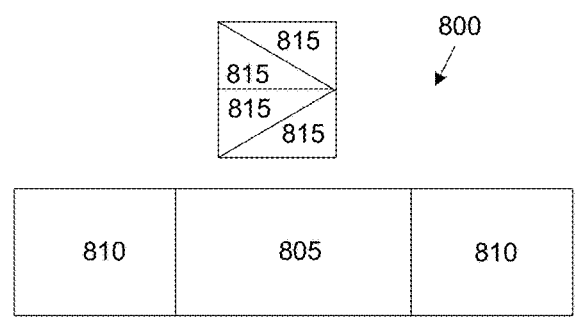
FIG. 27

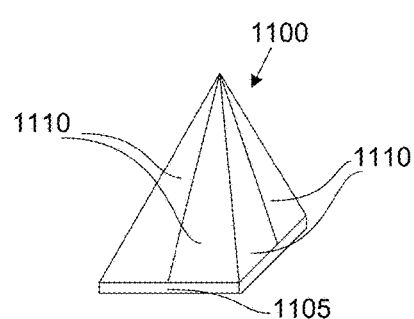
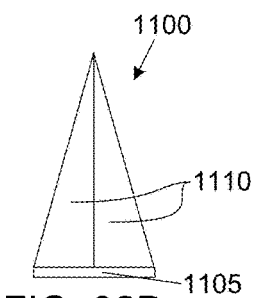
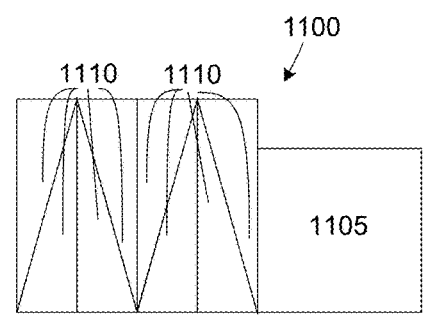
FIG. 32A   FIG. 32B   FIG. 32C
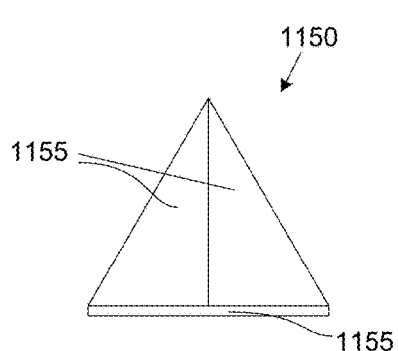
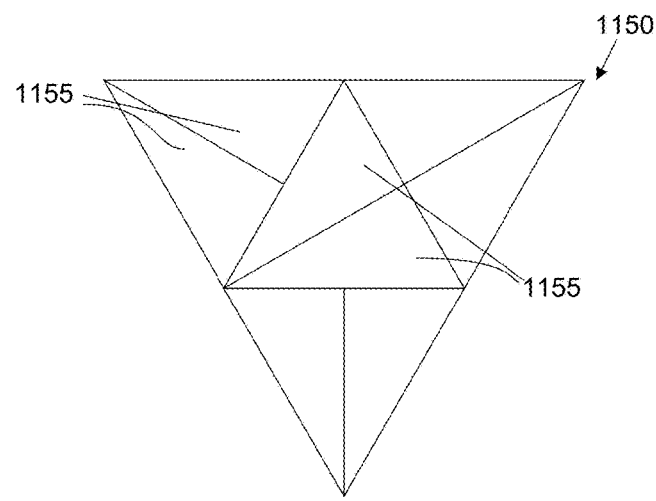
FIG. 33A   FIG. 33B
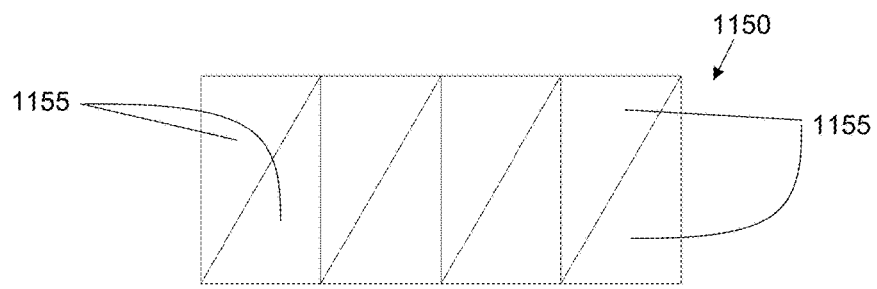
FIG. 33C

EDUCATIONAL SYSTEM, METHOD, AND APPARATUS

RELATED APPLICATIONS

This application claims the benefit of U.S. Provisional Patent Application Ser. No. 62/613,264 filed Jan. 3, 2018, which is hereby incorporated by reference in its entirety.

TECHNICAL FIELD

The present disclosure is directed to an educational system, method, and apparatus, and more particularly, to an educational system, method, and apparatus for illustrating or physically proving educational or instructional training objectives.

BACKGROUND OF THE DISCLOSURE

Conventional educational systems and methods, for example mathematical educational systems and methods, typically involve three-dimensional objects that may not be disassembled or two-dimensional illustrations or renderings that do not provide tangible learning tools that can be manipulated. Also for example, conventional systems and methods do not provide techniques for quantifying educational objectives. For example, conventional systems and methods do not provide physical proof to users such as students for educational objectives such as mathematical and geometrical objectives.

The exemplary disclosed system and method of the present disclosure is directed to overcoming one or more of the shortcomings set forth above and/or other deficiencies in existing technology.

SUMMARY OF THE INVENTION

In one aspect, the present invention is directed to an educational apparatus. The educational apparatus includes one or more first sheet members including a first side and a second side, the first side and the second side each having first markings indicating the same first surface area, and one or more first attachment portions disposed along some or substantially all of a perimeter of the one or more first sheet members. The educational apparatus also includes one or more second sheet members including a first side and a second side, the first side and the second side each having second markings indicating the same second surface area, and one or more second attachment portions disposed along some or substantially all of a perimeter of the one or more second sheet members. The one or more first sheet members and the one or more second sheet members are configured to be removably attachable to each other in a first arrangement by the one or more first and second attachment portions of the one or more first and second sheet members. The one or more first sheet members and the one or more second sheet members are configured to be removably attachable to each other in a second arrangement, which is different from the first arrangement, by the one or more first and second attachment portions of the one or more first and second sheet members. In at least one of the first and second arrangements, the one or more first sheet members and the one or more second sheet members are configured to form one or more substantially flat polygons showing, on a first polygon side, either the first side or the second side of each of the one or more first sheet members and one or more second sheet members.

In another aspect, the present invention is directed to a system for educational instruction. The system includes an educational instruction module, comprising computer-executable code stored in non-volatile memory, a processor, and a user interface. The educational instruction module, the processor, and the user interface are configured to display a plurality of sheet members on a display of the user interface, each of the plurality of sheet members including a first side and a second side, the first side and the second side each having markings indicating a surface area of the first and second sides, and one or more attachment portions disposed along some or substantially all of a perimeter of each of the plurality of sheet members, and receive user input data via the user interface. The educational instruction module, the processor, and the user interface are also configured to move the plurality of sheet members on the display of the user interface into a first arrangement based on the user input data, the first arrangement being a three-dimensional rendering of the plurality of sheet members that are attached via the one or more attachment portions. The educational instruction module, the processor, and the user interface are further configured to move the plurality of sheet members on the display of the user interface into a second arrangement based on the user input data, the second arrangement being a substantially flat polygon showing either the first side or the second side of each of the plurality of sheet members that are attached via the one or more attachment portions.

BRIEF DESCRIPTION OF THE DRAWINGS

Accompanying this written specification is a collection of drawings of exemplary embodiments of the present disclosure. One of ordinary skill in the art would appreciate that these are merely exemplary embodiments, and additional and alternative embodiments may exist and still within the spirit of the disclosure as described herein.

FIG. 23 is a schematic illustration of an exemplary system, in accordance with at least some exemplary embodiments of the present disclosure;

FIG. 24 is a schematic illustration of an exemplary system, in accordance with at least some exemplary embodiments of the present disclosure;

FIG. 25 is a schematic illustration of an exemplary system, in accordance with at least some exemplary embodiments of the present disclosure;

FIG. 26 is a schematic illustration of an exemplary system, in accordance with at least some exemplary embodiments of the present disclosure;

FIG. 27 is a schematic illustration of an exemplary system, in accordance with at least some exemplary embodiments of the present disclosure;

FIG. 32A is a perspective illustration of an exemplary system, in accordance with at least some exemplary embodiments of the present disclosure;

FIG. 32B is a front view of an exemplary system, in accordance with at least some exemplary embodiments of the present disclosure;

FIG. 32C is a schematic illustration of an exemplary system, in accordance with at least some exemplary embodiments of the present disclosure;

FIG. 33A is a front view of an exemplary system, in accordance with at least some exemplary embodiments of the present disclosure;

FIG. 33B is a schematic illustration of an exemplary system, in accordance with at least some exemplary embodiments of the present disclosure;

FIG. 33C is a schematic illustration of an exemplary system, in accordance with at least some exemplary embodiments of the present disclosure;

DETAILED DESCRIPTION AND INDUSTRIAL APPLICABILITY

The exemplary system disclosed herein may be any suitable system for illustrating educational objectives such as, for example mathematical, geometrical, engineering, and scientific principles. The exemplary system may be, for example, a physical apparatus, a computer-implemented system, and/or a system having both physical attributes and computer-implemented attributes. The exemplary system may for example be a toy such as an educational toy.

Figure 1:
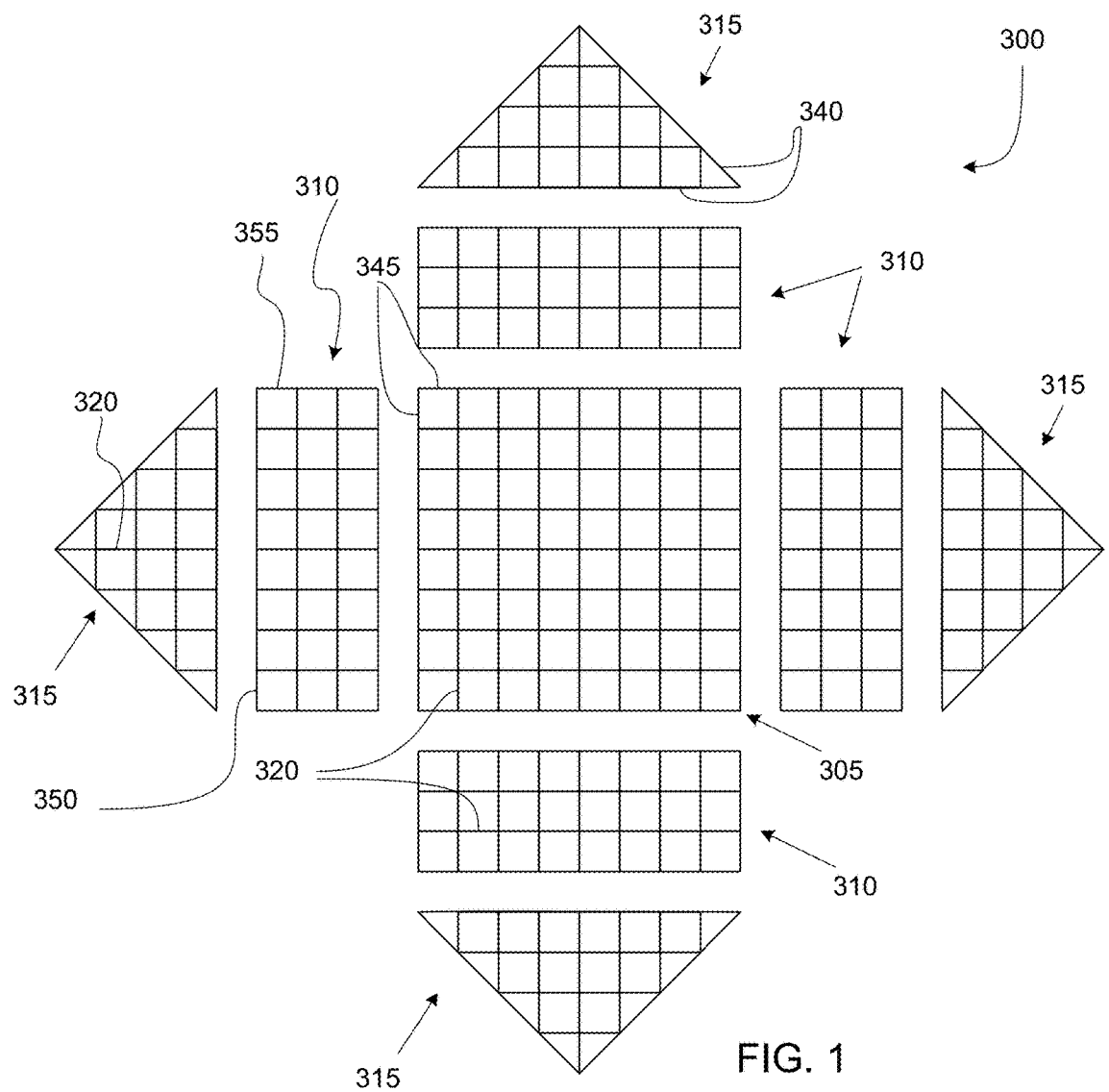
FIG. 1 is a schematic illustration of an exemplary system, in accordance with at least some exemplary embodiments of the present disclosure.

FIG. 1 illustrates an exemplary system 300. System 300 may include a plurality of members 305, 310, and 315. The exemplary members (e.g., members 305, 310, 315, and/or any other similar exemplary members disclosed herein) may be formed from any suitable materials such as, for example, metals and/or metal alloys, plastic, plastic composites, wood, and/or any other suitable material that may be used for forming two-dimensional and/or three-dimensional structures that may be assembled and/or disassembled. For example, the exemplary members may be substantially rigid members. Also for example, the exemplary members may include flexible materials as disclosed below regarding at least some exemplary embodiments. The exemplary members (e.g., members 305, 310, 315, and/or any other similar exemplary members disclosed herein) may for example be substantially flat, elongated members that may be, e.g., sheet or sheet-like members. For example, the exemplary members may be sheet members. For example, the exemplary members may have two elongated sides (e.g., elongated in both the length and width directions) and a thickness that is small relative to the dimensions of the two elongated sides. For example, the exemplary members may be elongated, flat pieces (e.g., tiles) of plastic, metal, and/or wood. For example, the exemplary members may be tiles such as plastic tiles. Also for example, system 300 may be a kit including a plurality of members 305, 310, and/or 315 (e.g., each exemplary system disclosed herein may be a kit including a plurality of exemplary members).

The exemplary members (e.g., members 305, 310, 315, and/or any other similar exemplary members disclosed herein) may include gridlines or any other suitable marking indicating spacing such as, for example, markings 320. For example, markings 320 may be a plurality of gridlines measuring surface area. For example, a plurality of markings 320 may be disposed on one or all surfaces of some or all of the exemplary members (e.g., members 305, 310, 315, and/or any other exemplary members disclosed herein). Markings 320 may, for example, be linear (e.g., or nonlinear and/or curved) markings that are etched, printed, drawn, adhered, and/or provided in any suitable manner onto the exemplary members. Markings 320 may for example be disposed on one, a plurality, or substantially all surfaces of the exemplary members.

Figure 3:
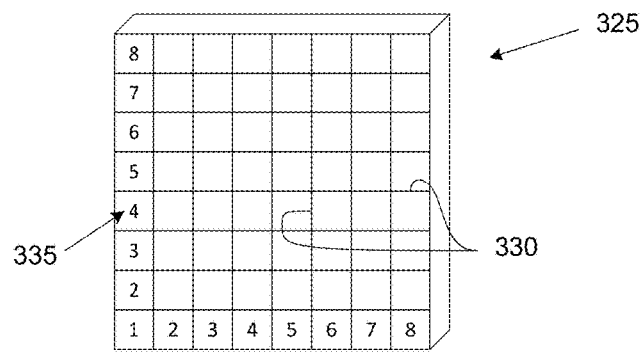
FIG. 3 is a schematic illustration of an exemplary system, in accordance with at least some exemplary embodiments of the present disclosure.

For example as illustrated in FIG. 3, an exemplary member 325 may be a substantially flat member including a plurality of markings 330 such as unit markings (e.g., unit markings indicating length or distance). Exemplary member 325 may include a plurality of references 335 that may be provided on a surface of member 325 in a manner similar to markings 320. References 335 may provide for example quantitative measurement between adjacent markings 330. For example, references 335 may provide measurement in inches between an end portion of member 325 and a given marking 330. For example as illustrated in FIG. 3, references 335 may designate a number of units that may be measured by markings 330 (e.g., 1 through 8). These exemplary units may be any suitable measurement unit such as, for example, inches or centimeters (e.g., or millimeters or feet or any other suitable unit of measurement). For example, member 325 may be an 8×8 inch or 8×8 centimeter member (e.g., or any other measurement of length x and width y such as a member having a length of between 1 and 100 units and a width of between 1 and 100 units wherein the overall length and width measurements may be different or the same). For example, member 325 may include a grid of markings 330 having distances between the markings 330 indicated by references 335. Some or all of the exemplary members disclosed in any of the disclosed exemplary embodiments herein may include markings and references similar to member 325 (merely for the sake of clarity, these references and markings have not been shown in many of the exemplary embodiments, though these exemplary embodiments may be provided with these references and/or markings).

References 335 may also be for example numerical marking indicating surface area. For example, references 335 may be markings indicating the quantitative surface area of a given side of an exemplary member. For example, reference 335 may be a marking of "6 in$^2$" that is disposed on member 325, e.g., when member 325 has an actual and/or represented surface area of "6 in$^2$" (e.g., or "2 in$^2$" when member 325 has an actual and/or represented surface area of 2 in$^2$, or any other suitable markings). For example, a user may simply read the markings of reference 335 of one or more exemplary members to quickly calculate a surface area of any exemplary arrangement of the exemplary systems disclosed herein. Also for example, references 335 may indicate a same surface area on either side of any of the exemplary disclosed members.

Returning to FIG. 1, some or all of the exemplary members may include exemplary attachment portions (e.g., portions 340, 345, 350, and 355). For example, exemplary attachment portions may be disposed at some or all end portions of a given exemplary member. For example, the exemplary attachment portions may be disposed along some or substantially all of a perimeter of the exemplary members. For example, attachment portions 340 may be disposed at some or all end portions of some or all members 315, attachment portions 345 may be disposed at some or all end portions of member 305, and attachment portions 350 and/or 355 may be disposed at one or more respective ends of some or all members 310. Exemplary attachment portions may for example be disposed along some or substantially an entire length (e.g., end portion length) of exemplary members. Exemplary attachment portions may also be disposed, for example, at interior portions of exemplary members. Some or all of the exemplary members disclosed herein may include attachment portions similar to attachment portions 340, 345, 350, and/or 355. For example, the exemplary members may be configured to be removably attachable to each other by the exemplary attachment portions. Also for example, the exemplary members may be removably attachable to each other to form a plurality (e.g., any suitable combination) of arrangements (e.g., in a first arrangement and in a second arrangement that is different from the first arrangement).

Figure 2:
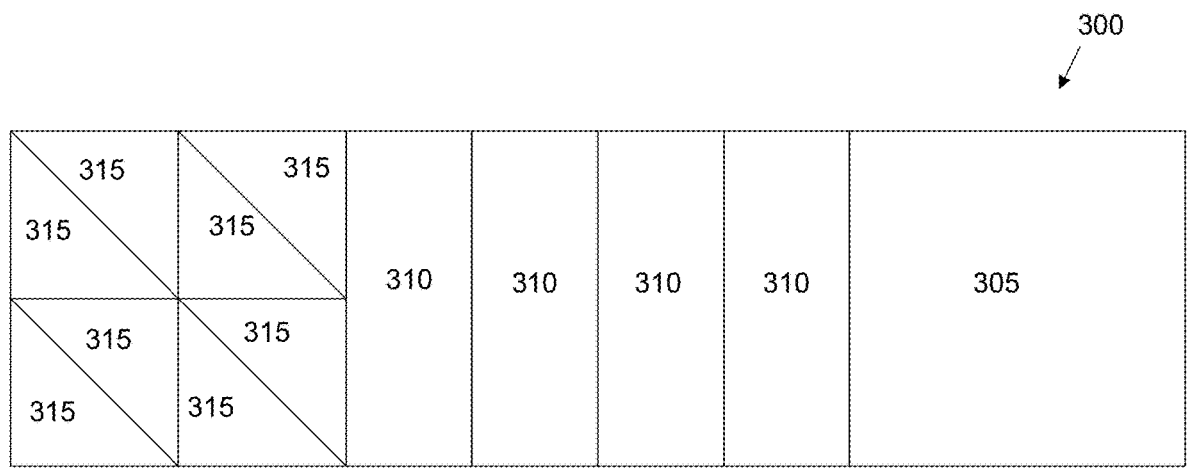
FIG. 2 is a schematic illustration of an exemplary system, in accordance with at least some exemplary embodiments of the present disclosure.
Figure 4:
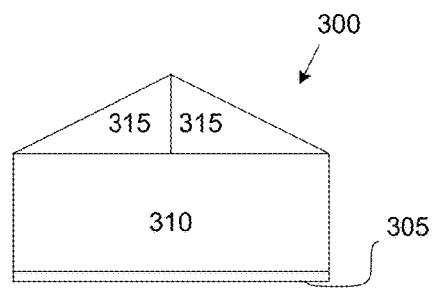
FIG. 4 is a front view of an exemplary system, in accordance with at least some exemplary embodiments of the present disclosure.
Figure 5:
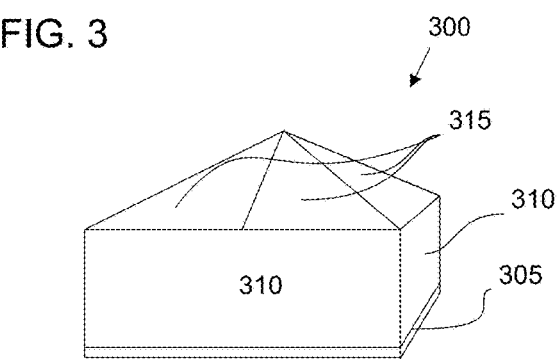
FIG. 5 is a perspective illustration of an exemplary system, in accordance with at least some exemplary embodiments of the present disclosure.

Exemplary attachment portions (e.g., portions 340, 345, 350, and 355) may be any suitable attachment portions for attaching any exemplary member to another exemplary member, for example as illustrated in FIGS. 2, 4, and 5. For example, the exemplary attachment portions may be for example magnetic attachment portions that connect the exemplary members in three-dimensional (e.g., as illustrated in FIGS. 4 and 5) and/or substantially flat arrangements or assemblies (e.g., as illustrated in FIG. 2). For example, the exemplary attachment portions may include magnetic elements disposed on or within the exemplary members. For example, some or substantially all of the exemplary attachment portions may be formed from any suitable magnetic material such as, for example, magnetized material such as magnetized iron, magnetized cobalt, rare-earth alloys, magnetized nickel, naturally occurring materials with magnetic properties, and/or any suitable ferromagnetic material. Also for example, attachment portions may be formed from any suitable material that is attracted to a magnet such as, for example, cobalt, iron, nickel, and/or any other suitable material. The exemplary attachment portions (e.g., portions 340, 345, 350, and 355) may also include mechanical fastening elements such as for example a twist-lock connection, a snap connection (e.g., snap and/or snap-fit connection), a screw-type connection, a friction-fit connection, an adhesive connection, a hook and loop connection, or any other suitable type of mechanical or other connection.

As illustrated in FIG. 2, the members of system 300 may be arranged side by side (e.g., adjacently), with the exemplary attachment portions (e.g., portions 340, 345, 350, and 355) connecting the plurality of exemplary members 305, 310, and 315. For example, the exemplary arrangement illustrated in FIG. 2 may be a substantially flat polygon showing, on a first polygon side, either the first side or the second side of each of the one or more exemplary members of the system (e.g., exemplary members 305, 310, and 315). Though omitted from the illustration of FIGS. 2, 4, and 5 for the sake of clarity, markings similar to markings 320 and/or 330 and references similar to references 335 may be disposed on some or all surfaces of the exemplary members.

Also, as illustrated in FIGS. 4 and 5, the members of system 300 may be arranged in any suitable three-dimensional configuration, with the exemplary attachment portions (e.g., portions 340, 345, 350, and 355) connecting the plurality of exemplary members 305, 310, and 315. For example, the exemplary three-dimensional configuration illustrated in FIGS. 4 and 5 may be a substantially hollow arrangement (e.g., assembly or structure) formed by substantially flat exemplary members. It is also contemplated that the exemplary members may be cubic, solid, and/or members of any suitable shape.

Figure 6:
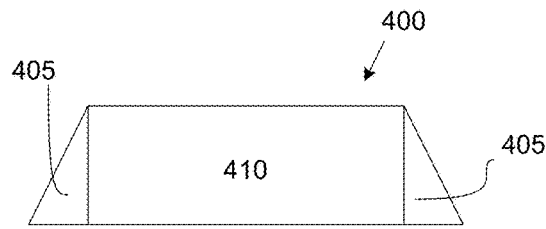
FIG. 6 is a schematic illustration of an exemplary system, in accordance with at least some exemplary embodiments of the present disclosure.
Figure 7:
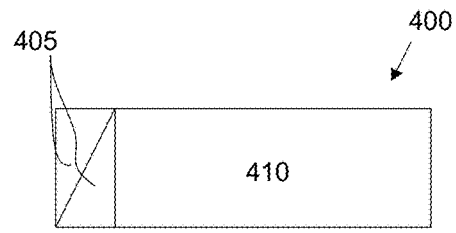
FIG. 7 is a schematic illustration of an exemplary system, in accordance with at least some exemplary embodiments of the present disclosure.

FIGS. 6 and 7 illustrate an exemplary system 400 (e.g., showing various exemplary arrangements). System 400 may include a plurality of members 405 and 410. Members 405 may have for example a right triangle shape and member 410 may for example have a rectangular shape (members 405 and 410 may also have any other suitable shape). Members 405 and 410 may include attachment portions similar to the exemplary attachment portions (e.g., similar to portions 340, 345, 350, and 355) of system 300. Though omitted from the schematic illustration of FIGS. 6 and 7 for the sake of clarity, markings similar to markings 320 and/or 330 and references similar to references 335 may be disposed on some or all surfaces of members 405 and 410. Members 405 and 410 may be arranged in any suitable two-dimensional (e.g., arranged in a single plane) or three-dimensional overall arrangement such as, for example, to form a two-dimensional trapezoid as illustrated in FIG. 6 and/or a two-dimensional rectangle as illustrated in FIG. 7 (e.g., as well as two two-dimensional rectangles such as members 405 forming a rectangle and member 410 disposed adjacent to each other and separated). For example, markings similar to markings 320 and/or 330 and references similar to references 335 that may be disposed on some or all surfaces of members 405 and 410 may indicate dimensions and shape properties to a user of the exemplary system such as, for example, length, width, area of two-dimensional arrangements, and/or surface area and volume of three-dimensional arrangements.

Figure 8:
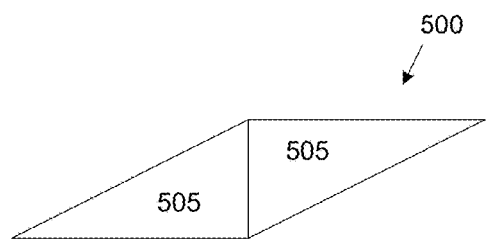
FIG. 8 is a schematic illustration of an exemplary system, in accordance with at least some exemplary embodiments of the present disclosure.
Figure 9A:
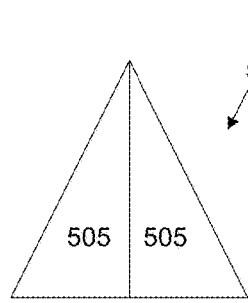
FIG. 9A is a schematic illustration of an exemplary system, in accordance with at least some exemplary embodiments of the present disclosure.
Figure 9B:
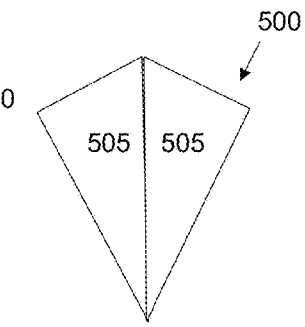
FIG. 9B is a schematic illustration of an exemplary system, in accordance with at least some exemplary embodiments of the present disclosure.
Figure 10:
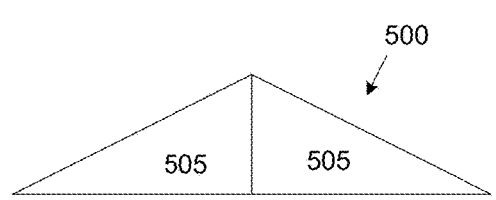
FIG. 10 is a schematic illustration of an exemplary system, in accordance with at least some exemplary embodiments of the present disclosure.
Figure 11:
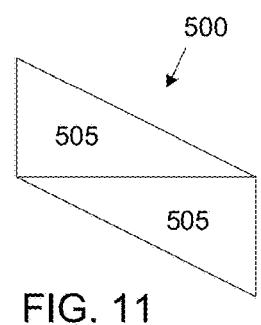
FIG. 11 is a schematic illustration of an exemplary system, in accordance with at least some exemplary embodiments of the present disclosure.
Figure 12:
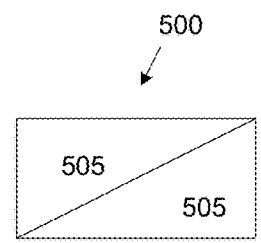
FIG. 12 is a schematic illustration of an exemplary system, in accordance with at least some exemplary embodiments of the present disclosure.

FIGS. 8-12 illustrate an exemplary system 500 (e.g., showing various exemplary arrangements). System 500 may include a plurality of members 505. Members 505 may have for example right triangle shapes (members 505 may also have any other suitable shape and may each be for example of a different shape). Members 505 may include attachment portions similar to the exemplary attachment portions (e.g., similar to portions 340, 345, 350, and 355) of system 300. Though omitted from the schematic illustration of FIGS. 8-12 for the sake of clarity, markings similar to markings 320 and/or 330 and references similar to references 335 may be disposed on some or all surfaces of members 505. Members 505 may be arranged in any suitable two-dimensional (e.g., arranged in a single plane) or three-dimensional overall arrangement such as, for example, to form two-dimensional parallelograms of differing dimensions as illustrated in FIG. 8 (e.g., having the shorter sides of members 505 together) and FIG. 11 (e.g., having the longer sides of members 505 together), two-dimensional isosceles triangles of differing dimensions as illustrated in FIG. 9A (e.g., having the longer sides of members 505 together) and FIG. 10 (e.g., having the shorter sides of members 505 together), a kite shape as illustrated in FIG. 9B, and/or a two-dimensional rectangle as illustrated in FIG. 12. For example, markings similar to markings 320 and/or 330 and references similar to references 335 that may be disposed on some or all surfaces of members 505 may indicate dimensions and shape properties to a user of the exemplary system such as, for example, length, width, area of two-dimensional arrangements, and/or surface area and volume of three-dimensional arrangements. Also for example, as illustrated in FIG. 9A, edges having attachment portions connecting members 505 may illustrate a perpendicular bisector of a triangle formed by members 505.

Figure 13:
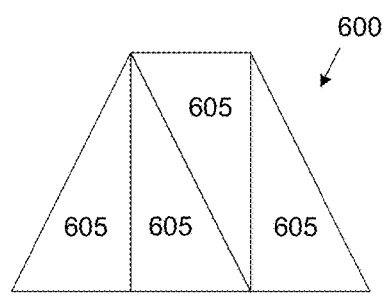
FIG. 13 is a schematic illustration of an exemplary system, in accordance with at least some exemplary embodiments of the present disclosure.
Figure 14:
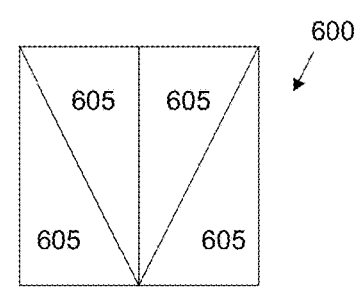
FIG. 14 is a schematic illustration of an exemplary system, in accordance with at least some exemplary embodiments of the present disclosure.

FIGS. 13 and 14 illustrate an exemplary system 600 (e.g., showing various exemplary arrangements). System 600 may include a plurality of members 605. Members 605 may have for example a right triangle shape (e.g., members 605 may also have any other suitable shape). Members 605 may include attachment portions similar to the exemplary attachment portions (e.g., similar to portions 340, 345, 350, and 355) of system 300. Though omitted from the schematic illustration of FIGS. 13 and 14 for the sake of clarity, markings similar to markings 320 and/or 330 and references similar to references 335 may be disposed on some or all surfaces of members 605. Members 605 may be arranged in any suitable two-dimensional (e.g., arranged in a single plane) or three-dimensional overall arrangement such as, for example, to form a two-dimensional trapezoid as illustrated in FIG. 13 and/or a two-dimensional rectangle as illustrated in FIG. 14. For example, markings similar to markings 320 and/or 330 and references similar to references 335 that may be disposed on some or all surfaces of members 605 may indicate dimensions and shape properties to a user of the exemplary system such as, for example, length, width, area of two-dimensional arrangements, and/or surface area and volume of three-dimensional arrangements.

Figure 15:
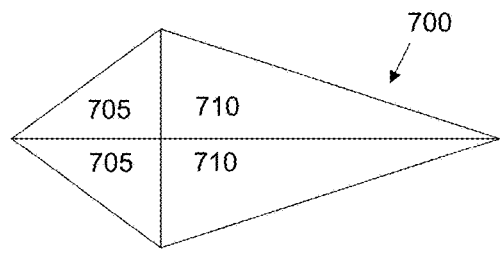
FIG. 15 is a schematic illustration of an exemplary system, in accordance with at least some exemplary embodiments of the present disclosure.
Figure 16:
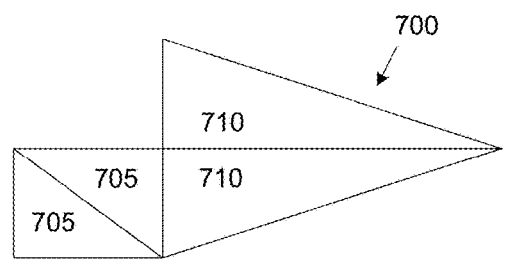
FIG. 16 is a schematic illustration of an exemplary system, in accordance with at least some exemplary embodiments of the present disclosure.
Figure 17:
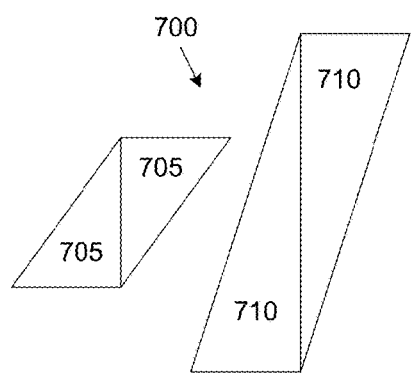
FIG. 17 is a schematic illustration of an exemplary system, in accordance with at least some exemplary embodiments of the present disclosure.
Figure 18:
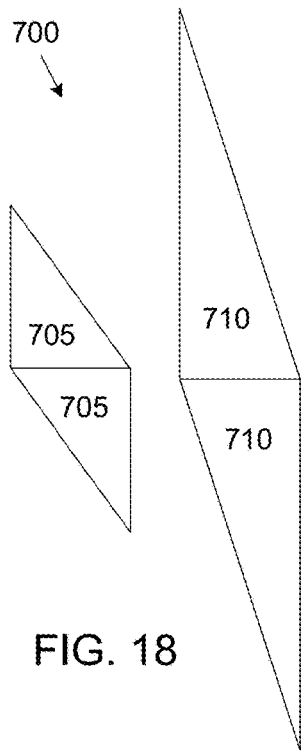
FIG. 18 is a schematic illustration of an exemplary system, in accordance with at least some exemplary embodiments of the present disclosure.
Figure 19:
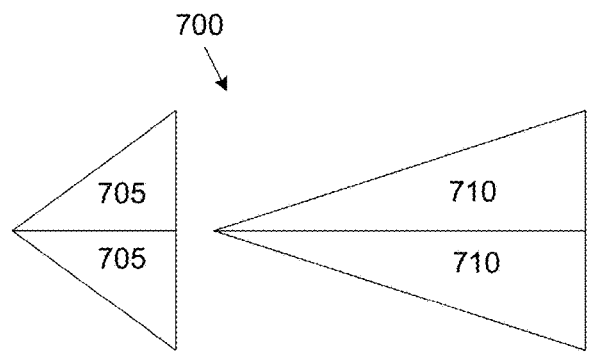
FIG. 19 is a schematic illustration of an exemplary system, in accordance with at least some exemplary embodiments of the present disclosure.
Figure 20:
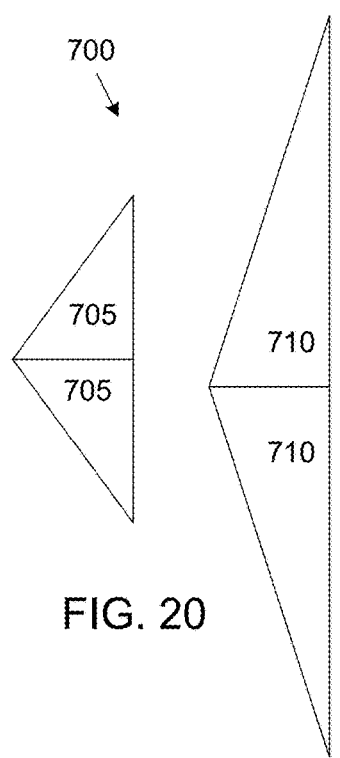
FIG. 20 is a schematic illustration of an exemplary system, in accordance with at least some exemplary embodiments of the present disclosure.
Figure 21:
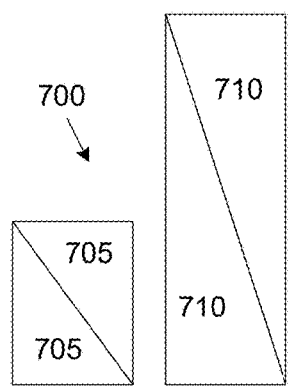
FIG. 21 is a schematic illustration of an exemplary system, in accordance with at least some exemplary embodiments of the present disclosure.
Figure 22:
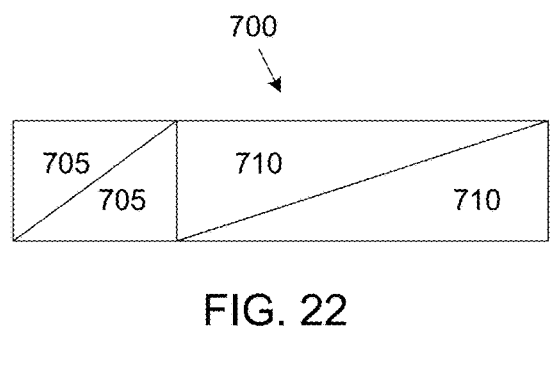
FIG. 22 is a schematic illustration of an exemplary system, in accordance with at least some exemplary embodiments of the present disclosure.

FIGS. 15-22 illustrate an exemplary system 700 (e.g., showing various exemplary arrangements). System 700 may include a plurality of members 705 and 710. Members 705 and 710 may have for example right triangle shapes (e.g., members 705 and 710 may also have any other suitable shape and may each be for example of a different shape). Members 705 and 710 may include attachment portions similar to the exemplary attachment portions (e.g., similar to portions 340, 345, 350, and 355) of system 300. Though omitted from the schematic illustration of FIGS. 15-22 for the sake of clarity, markings similar to markings 320 and/or 330 and references similar to references 335 may be disposed on some or all surfaces of members 705 and 710. Members 705 and 710 may be arranged in any suitable two-dimensional (e.g., arranged in a single plane) or three-dimensional overall arrangement such as, for example, to form a two-dimensional kite shape (e.g., a quadrilateral having two pairs of equal-length sides that are adjacent to each other) as illustrated in FIG. 15, a two-dimensional polygonal shape having six sides as illustrated in FIG. 16, pairs of parallelograms of differing dimensions as illustrated in FIG. 17 (e.g., pairs of parallelograms having the longer sides of members 705 together and the longer sides of members 710 together) and FIG. 18 (e.g., pairs of parallelograms having the shorter sides of members 705 together and the shorter sides of members 710 together), pairs of two-dimensional isosceles triangles of differing dimensions as illustrated in FIG. 19 (e.g., pairs of isosceles triangles having the longer sides of members 705 together and the longer sides of members 710 together) and FIG. 20 (e.g., pairs of isosceles triangles having the shorter sides of members 705 together and the shorter sides of members 710 together), a pair of two-dimensional rectangles (e.g., a rectangle formed by members 705 and a rectangle formed by members 710) as illustrated in FIG. 21, and/or a single two-dimensional rectangle as illustrated in FIG. 22. For example, markings similar to markings 320 and/or 330 and references similar to references 335 that may be disposed on some or all surfaces of members 705 and 710 may indicate dimensions and shape properties to a user of the exemplary system such as, for example, length, width, area of two-dimensional arrangements, and/or surface area and volume of three-dimensional arrangements.

FIGS. 23-27 illustrate an exemplary system 800 (e.g., showing various exemplary arrangements). System 800 may include a plurality of members 805, 810, and 815. Members 805 and 810 may have for example rectangular shapes and members 815 may have for example right triangle shapes (e.g., members 805, 810, and 815 may also have any other suitable shape and may each be for example of a different shape). Members 805, 810, and 815 may include attachment portions similar to the exemplary attachment portions (e.g., similar to portions 340, 345, 350, and 355) of system 300. Though omitted from the schematic illustration of FIGS. 23-27 for the sake of clarity, markings similar to markings 320 and/or 330 and references similar to references 335 may be disposed on some or all surfaces of members 805, 810, and 815. Members 805, 810, and 815 may be arranged in any suitable two-dimensional (e.g., arranged in a single plane) or three-dimensional overall arrangement such as, for example, to form a two-dimensional polygonal shape having ten sides as illustrated in FIG. 23, a two-dimensional polygonal shape having eight sides as illustrated in FIG. 24, three separate rectangles and a pair of parallelograms of similar dimensions as illustrated in FIG. 25 (e.g., pairs of parallelograms having the shorter sides of members 815 together), a rectangle (e.g., including members 805 and 810) and a pair of parallelograms of similar dimensions as illustrated in FIG. 26 (e.g., pairs of parallelograms having the longer sides of members 815 together), and/or a first two-dimensional rectangle (e.g., including members 805 and 810) and a second two-dimensional rectangle (e.g., including members 815) as illustrated in FIG. 27. For example, markings similar to markings 320 and/or 330 and references similar to references 335 that may be disposed on some or all surfaces of members 805, 810, and 815 may indicate dimensions and shape properties to a user of the exemplary system such as, for example, length, width, area of two-dimensional arrangements, and/or surface area and volume of three-dimensional arrangements.

Figure 28:
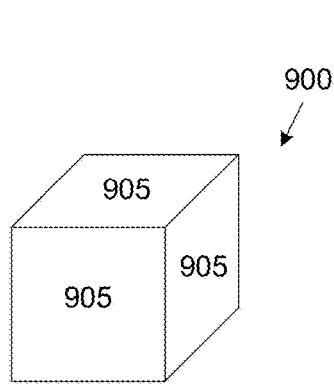
FIG. 28 is a perspective illustration of an exemplary system, in accordance with at least some exemplary embodiments of the present disclosure.
Figure 29:
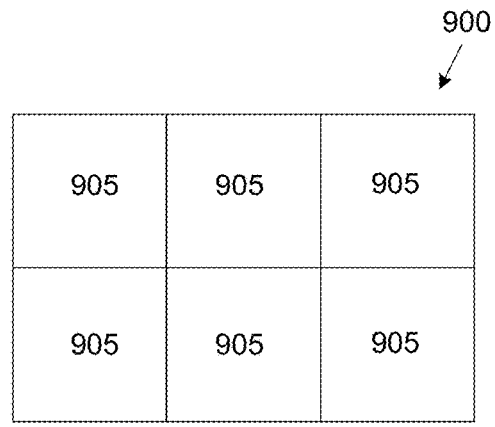
FIG. 29 is a schematic illustration of an exemplary system, in accordance with at least some exemplary embodiments of the present disclosure.

FIGS. 28 and 29 illustrate an exemplary system 900 (e.g., showing various exemplary arrangements). System 900 may include a plurality of members 905. Members 905 may have for example rectangular or square shapes (members 905 may also have any other suitable shape and may each be for example of a different shape). Members 905 may include attachment portions similar to the exemplary attachment portions (e.g., similar to portions 340, 345, 350, and 355) of system 300. Though omitted from the schematic illustration of FIGS. 28 and 29 for the sake of clarity, markings similar to markings 320 and/or 330 and references similar to references 335 may be disposed on some or all surfaces of members 905. Members 905 may be arranged in any suitable two-dimensional (e.g., arranged in a single plane) or three-dimensional overall arrangement. For example as illustrated in FIG. 28, members 905 may be arranged to form a three-dimensional, substantially hollow cube and/or cuboid assembly (e.g., having six surfaces, or a similar shape having any suitable number of surfaces). Members 905 may also be re-arranged to form a two-dimensional rectangle as illustrated in FIG. 29 (e.g., a rectangle formed by members 905 being placed in substantially the same plane such as, for example, when placed on flat surface such as for example a classroom desk or floor). For example, markings similar to markings 320 and/or 330 and references similar to references 335 that may be disposed on some or all surfaces of members 905 may indicate dimensions and shape properties to a user of the exemplary system such as, for example, length, width, area of two-dimensional arrangements, and/or surface area and volume of three-dimensional arrangements. For example, a total area of the surfaces showing in plan in FIG. 29 may be equal to a surface area of the exemplary shape illustrated in FIG. 28.

Figure 30:
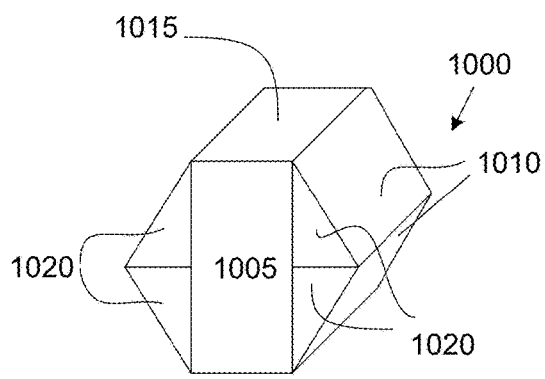
FIG. 30 is a perspective illustration of an exemplary system, in accordance with at least some exemplary embodiments of the present disclosure.
Figure 31:
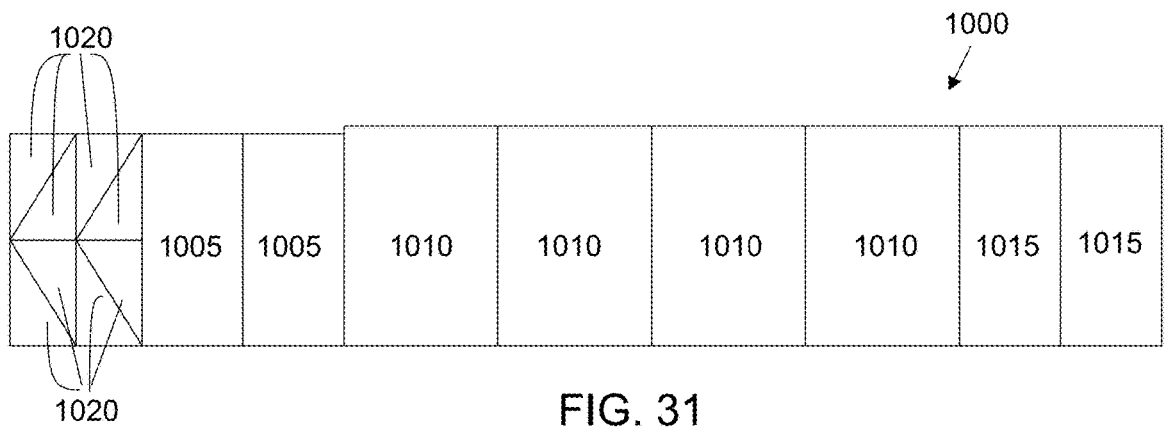
FIG. 31 is a schematic illustration of an exemplary system, in accordance with at least some exemplary embodiments of the present disclosure.

FIGS. 30 and 31 illustrate an exemplary system 1000 (e.g., showing various exemplary arrangements). System 1000 may include a plurality of members 1005, 1010, 1015, and 1020. Members 1005, 1010, and 1015 may have for example rectangular or square shapes and members 1020 may have for example right triangle shapes (e.g., members 1005, 1010, 1015, and 1020 may also have any other suitable shape and may each be for example of a different shape). Members 1005, 1010, 1015, and 1020 may include attachment portions similar to the exemplary attachment portions (e.g., similar to portions 340, 345, 350, and 355) of system 300. Though omitted from the schematic illustration of FIGS. 30 and 31 for the sake of clarity, markings similar to markings 320 and/or 330 and references similar to references 335 may be disposed on some or all surfaces of members 1005, 1010, 1015, and 1020. Members 1005, 1010, 1015, and 1020 may be arranged in any suitable two-dimensional (e.g., arranged in a single plane) or three-dimensional overall arrangement. For example as illustrated in FIG. 30, members 1005, 1010, 1015, and 1020 may be arranged to form a three-dimensional, substantially hollow prism (e.g., hexagonal prism having eight surfaces, or a similar shape having any suitable number of surfaces). Members 1005, 1010, 1015, and 1020 may also be re-arranged to form a two-dimensional polygon as illustrated in FIG. 31 (e.g., a rectangle formed by members 1005 and 1020 placed adjacent to or separately from a rectangle formed by members 1010 and 1015 in substantially the same plane such as, for example, when placed on a flat surface). For example, markings similar to markings 320 and/or 330 and references similar to references 335 that may be disposed on some or all surfaces of members 1005, 1010, 1015, and 1020 may indicate dimensions and shape properties to a user of the exemplary system such as, for example, length, width, area of two-dimensional arrangements, and/or surface area and volume of three-dimensional arrangements. For example, a total area of the surfaces showing in plan in FIG. 31 may be equal to a surface area of the exemplary shape illustrated in FIG. 30.

FIGS. 32A, 32B, and 32C illustrate an exemplary system 1100 (e.g., showing various exemplary arrangements). System 1100 may include a plurality of members 1105 and 1110. Member 1105 may have for example rectangular or square shapes and members 1110 may have for example right triangle shapes (e.g., members 1105 and 1110 may also have any other suitable shape and may each be for example of a different shape). Members 1105 and 1110 may include attachment portions similar to the exemplary attachment portions (e.g., similar to portions 340, 345, 350, and 355) of system 300. Though omitted from the schematic illustration of FIGS. 32A, 32B, and 32C for the sake of clarity, markings similar to markings 320 and/or 330 and references similar to references 335 may be disposed on some or all surfaces of members 1105 and 1110. Members 1105 and 1110 may be arranged in any suitable two-dimensional (e.g., arranged in a single plane) or three-dimensional overall arrangement. For example as illustrated in FIGS. 32A and 32B, members 1105 and 1110 may be arranged to form a three-dimensional, substantially hollow pyramid (e.g., a square-based pyramid having five surfaces, a triangular-based pyramid having four surfaces, or a similar shape having any suitable number of surfaces). Members 1105 and 1110 may also be re-arranged to form a two-dimensional polygon as illustrated in FIG. 32C (e.g., a rectangle formed by member 1105 placed adjacent to or separately from a rectangle formed by members 1110 in substantially the same plane such as, for example, when placed on a flat surface). For example, markings similar to markings 320 and/or 330 and references similar to references 335 that may be disposed on some or all surfaces of members 1105 and 1110 may indicate dimensions and shape properties to a user of the exemplary system such as, for example, length, width, area of two-dimensional arrangements, and/or surface area and volume of three-dimensional arrangements. For example, a total area of the surfaces showing in plan in FIG. 32C may be equal to a surface area of the exemplary shape illustrated in FIGS. 32A and 32B.

Also for example, FIGS. 33A, 33B, and 33C illustrate an exemplary system 1150 (e.g., showing various exemplary arrangements). System 1150 may include a plurality of members 1155. Member 1155 may have for example right triangle shapes (e.g., members 1155 may also have any other suitable shape and may each be for example of a different shape). Members 1155 may include attachment portions similar to the exemplary attachment portions (e.g., similar to portions 340, 345, 350, and 355) of system 300. Though omitted from the schematic illustration of FIGS. 33A, 33B, and 33C for the sake of clarity, markings similar to markings 320 and/or 330 and references similar to references 335 may be disposed on some or all surfaces of members 1155. Members 1155 may be arranged in any suitable two-dimensional (e.g., arranged in a single plane) or three-dimensional overall arrangement. For example as illustrated in FIGS. 33A and 33B, members 1155 may be arranged to form a three-dimensional, substantially hollow pyramid (e.g., a triangular-based pyramid having three surfaces, or a similar shape having any suitable number of surfaces). Members 1155 may also be re-arranged to form a two-dimensional polygon as illustrated in FIG. 33C (e.g., a rectangle formed by members 1155 in substantially the same plane such as, for example, when placed on a flat surface). For example, markings similar to markings 320 and/or 330 and references similar to references 335 that may be disposed on some or all surfaces of members 1155 may indicate dimensions and shape properties to a user of the exemplary system such as, for example, length, width, area of two-dimensional arrangements, and/or surface area and volume of three-dimensional arrangements. For example, a total area of the surfaces showing in plan in FIG. 33C may be equal to a surface area of the exemplary shape illustrated in FIGS. 33A and 33B.

Figure 34:
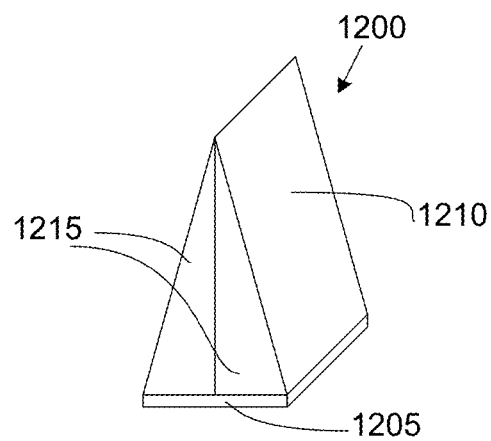
FIG. 34 is a perspective illustration of an exemplary system, in accordance with at least some exemplary embodiments of the present disclosure.
Figure 35:
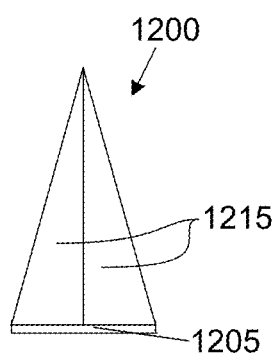
FIG. 35 is a front view of an exemplary system, in accordance with at least some exemplary embodiments of the present disclosure.
Figure 36:
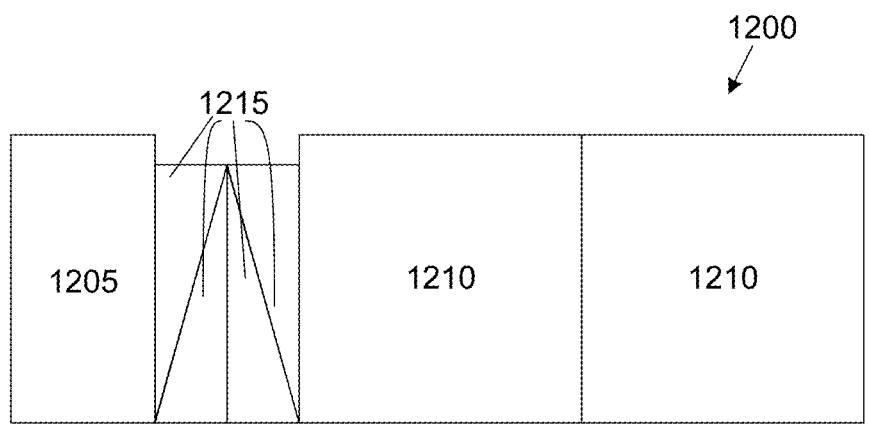
FIG. 36 is a schematic illustration of an exemplary system, in accordance with at least some exemplary embodiments of the present disclosure.

FIGS. 34, 35, and 36 illustrate an exemplary system 1200 (e.g., showing various exemplary arrangements). System 1200 may include a plurality of members 1205, 1210, and 1215. Members 1205 and 1210 may have for example rectangular or square shapes and members 1215 may have for example right triangle shapes (e.g., members 1205, 1210, and 1215 may also have any other suitable shape and may each be for example of a different shape). Members 1205, 1210, and 1215 may include attachment portions similar to the exemplary attachment portions (e.g., similar to portions 340, 345, 350, and 355) of system 300. Though omitted from the schematic illustration of FIGS. 34-36 for the sake of clarity, markings similar to markings 320 and/or 330 and references similar to references 335 may be disposed on some or all surfaces of members 1205, 1210, and 1215. Members 1205, 1210, and 1215 may be arranged in any suitable two-dimensional (e.g., arranged in a single plane) or three-dimensional overall arrangement. For example as illustrated in FIGS. 34 and 35, members 1205, 1210, and 1215 may be arranged to form a three-dimensional, substantially hollow prism (e.g., a triangular prism having five surfaces, or a similar shape such as a prism having any suitable number of surfaces, e.g., an octagonal prism). Members 1205, 1210, and 1215 may also be re-arranged to form a two-dimensional polygon as illustrated in FIG. 36 (e.g., a polygon formed by members 1205, 1210, and 1215 placed in substantially the same plane such as, for example, when placed on a flat surface). For example, markings similar to markings 320 and/or 330 and references similar to references 335 that may be disposed on some or all surfaces of members 1205, 1210, and 1215 may indicate dimensions and shape properties to a user of the exemplary system such as, for example, length, width, area of two-dimensional arrangements, and/or surface area and volume of three-dimensional arrangements. For example, a total area of the surfaces showing in plan in FIG. 36 may be equal to a surface area of the exemplary shape illustrated in FIGS. 34 and 35.

Figure 37A:
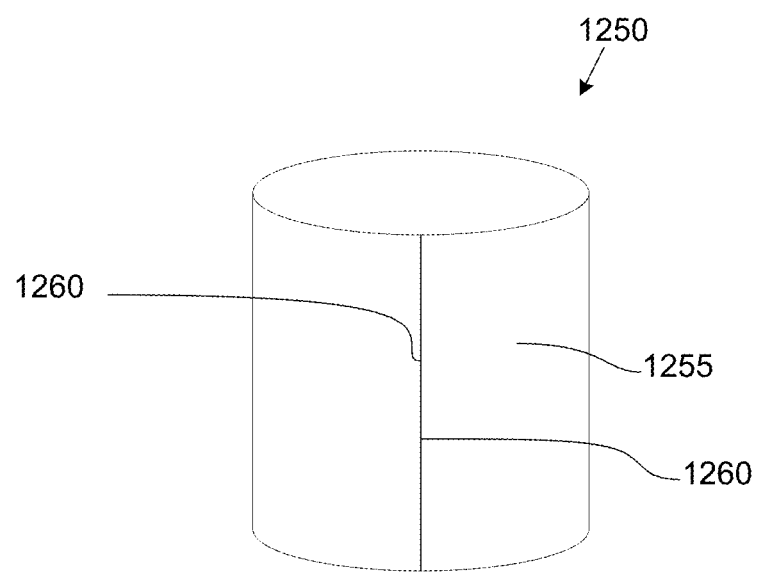
FIG. 37A is a perspective illustration of an exemplary system, in accordance with at least some exemplary embodiments of the present disclosure.
Figure 37B:
FIG. 37B is a schematic illustration of an exemplary system, in accordance with at least some exemplary embodiments of the present disclosure.

FIGS. 37A and 37B illustrate an exemplary system 1250 (e.g., showing various exemplary arrangements). System 1250 may include a member 1255 (e.g. or one or more members 1255). Member 1255 may for example be formed from a flexible material that may allow member 1255 to be deformed (e.g., bent) between various configurations such as between FIGS. 37A and 37B. For example, member 1255 may include any suitable flexible material such as elastomeric material, natural rubber, synthetic rubber, neoprene, latex, chloroprene, vinyl material, nylon, thermoplastic elastomers, and/or any other suitable type of material having elastic properties. Also for example, any exemplary member disclosed herein in the other exemplary embodiments may also include flexible material. Member 1255 may have for example a rectangular or square shape (e.g., member 1255 may also have any other suitable shape). Member 1255 may include attachment portions 1260 similar to the exemplary attachment portions (e.g., similar to portions 340, 345, 350, and 355) of system 300. For example, a user may deform (e.g., bend) member 1255 from the configuration of FIG. 37B to the configuration of 37A, with attachment portions 1260 holding member 1255 in a three-dimensional shape (e.g., as illustrated in FIG. 37A). Though omitted from the schematic illustration of FIGS. 37A and 37B for the sake of clarity, markings similar to markings 320 and/or 330 and references similar to references 335 may be disposed on some or all surfaces of member 1255. Member 1255 may be arranged in any suitable two-dimensional (e.g., arranged in a single plane) or three-dimensional overall arrangement. For example as illustrated in FIG. 37A, member 1255 may be arranged to form a three-dimensional, substantially hollow shape (e.g., a cylinder such as an open cylinder). Member 1255 may also be re-arranged to form a two-dimensional rectangle or square as illustrated in FIG. 37B (e.g., when placed in substantially the same plane such as, for example, when placed on a flat surface). For example, markings similar to markings 320 and/or 330 and references similar to references 335 that may be disposed on some or all surfaces of member 1255 may indicate dimensions and shape properties to a user of the exemplary system such as, for example, length, width, area of two-dimensional arrangements, and/or surface area and volume of three-dimensional arrangements. For example, a total area of the surfaces showing in plan in FIG. 37B may be equal to a surface area of the exemplary shape illustrated in FIG. 37A. Also for example, a length of a top or bottom edge illustrated in FIG. 37B may be respectively equal to a top or bottom circumference illustrated in FIG. 37A.

An exemplary system of the present disclosure may include any number and/or type of shape of exemplary members. For example, a given exemplary system may include some or all of the exemplary members disclosed herein, and in any number. Also for example, exemplary members may be of any suitable shape or size. For example, the embodiments disclosed herein provide examples of types of members that can be included in exemplary systems, and exemplary systems may include exemplary members having shapes, sizes, and configurations of any type (e.g., 5-sided, 20-sided, and/or of any shape).

The exemplary disclosed invention may provide a system, method, and apparatus for providing physical evidence to support and prove analysis such as, for example, involving mathematical proofs. The exemplary disclosed system, method, and apparatus may be used for example in any activity in which physical and concrete evidence is provided to support analysis. For example, the exemplary system, method, and apparatus may be used to support educational goals in classrooms and educational instruction (e.g., proving mathematical and geometric proofs), vocational training, professional training, and/or supporting calculations and analysis used in science, technology, engineering, and mathematical analysis including professional and/or hands-on projects and training. The exemplary system, method, and apparatus may also be used in any application involving an educational toy.

A number of exemplary methods illustrating the operation of the exemplary system and apparatus will now be disclosed. For example, a user may be provided with an exemplary system including members illustrated in FIG. 1 (e.g., system 300). The user may assemble the exemplary members into the structure illustrated in FIGS. 4 and 5, attaching exemplary members together via the exemplary attachment portions (e.g., similar to portions 340, 345, 350, and 355). In order to for example physically prove a surface area of the structure illustrated in FIGS. 4 and 5 that the user may assemble, the user may take the members apart (e.g., member 305, four members 310, and eight members 315) and arrange the members as a two-dimensional polygon as illustrated in FIG. 2. The two-dimensional polygon of FIG. 2 may be a rectangle having a continuous set of markings 320 across the entire surface illustrated in FIG. 2. The user may count markings along an entire length of the rectangle illustrated in FIG. 2 and across an entire width illustrated in FIG. 2 (e.g., the user may count each marking 320 along the length or width or may use references 335 to assist with counting). The user may then multiply the total length dimension by the total width dimension of the two-dimensional rectangle (e.g., multiplying the dimensions of two perpendicular edges) illustrated in FIG. 2 to calculate a surface area of the entire three-dimensional structure illustrated in FIGS. 4 and 5. Also for example, when references 335 that are numerical markings indicating surface area are disposed on the exemplary members, the user may add together the values provided by the numerical markings to obtain a total area.

Also for example, a user may utilize exemplary system 400 illustrated in FIGS. 6 and 7 to physically prove that a rectangle and a trapezoid have congruent areas (e.g., same formula may be used for area). For example, a user may assemble the trapezoid illustrated in FIG. 6. The user may then rearrange members 405 and 410 to form the rectangle illustrated in FIG. 7. Because the trapezoid and rectangle both use the same members having the same area, the user thereby proves that the areas of the trapezoid and rectangle are geometrically congruent and mathematically equal. The user may calculate the area by multiplying the length and width of the rectangle of FIG. 7 by using markings 320, or references 335 that are numerical markings indicating surface area, similarly to as disclosed above (e.g., the area may be the actual area in for example square inches or square centimeters depending on the unit of measurement used for markings 320).

A user may similarly use system 500 illustrated in FIGS. 8-12 to prove that parallelograms of differing dimensions (e.g., as illustrated in FIGS. 8 and 11) have congruent geometric areas and/or equal mathematical areas as the rectangle illustrated in FIG. 12. The user may further rearrange members 505 to physically prove that the isosceles triangles of differing dimensions (e.g., as illustrated in FIGS. 9 and 10) also have congruent geometric areas and/or equal mathematical areas as the rectangle illustrated in FIG. 12 and the parallelogram illustrated in FIGS. 8 and 11. For example, the user may use system 500 to physically prove that triangles having different height and base dimensions may have congruent geometric areas and equal mathematical areas (e.g., the triangles of FIGS. 9 and 10 may be described by the same mathematical formulas describing area). Also for example, the user may calculate the area of all of the configurations similarly to as disclosed above based on the rectangle of FIG. 12 (e.g., by counting markings 320, and/or by adding references 335 that are numerical markings indicating surface area).

A user may also similarly use system 600 illustrated in FIGS. 13 and 14 to prove that a trapezoid and rectangle may have congruent geometric areas and/or equal mathematical areas. The user may calculate the area of both the trapezoid and rectangle based on the rectangle of FIG. 14 similarly to as disclosed above.

Similar to above, a user may physically prove that the following configurations all have a congruent total area and/or equal mathematical areas: the kite of FIG. 15, the polygon of FIG. 16, the pair of parallelograms of FIG. 17, the pair of parallelograms of FIG. 18, the pair of isosceles triangles of FIG. 19, the pair of isosceles triangles of FIG. 20, the pair of rectangles of FIG. 21, and the single rectangle of FIG. 22. Also for example, the user may calculate the area of all of the configurations similarly to as disclosed above based, e.g., on the rectangle of FIG. 22 (e.g., by counting markings 320 and/or adding up numerical values indicated by references 335). A user may also for example make similar physical proofs for exemplary system 800 illustrated in FIGS. 23-27 as the physical proofs disclosed above regarding the above-disclosed exemplary embodiments.

Also for example, a user may assemble the exemplary members of system 900 into the structure illustrated in FIG. 28 by attaching exemplary members together via the exemplary attachment portions (e.g., similar to portions 340, 345, 350, and 355). In order to for example physically prove a surface area of the structure illustrated in FIG. 28 that the user assembled, the user may take the members apart (e.g., six members 905) and arrange the members as a two-dimensional polygon as illustrated in FIG. 29. The two-dimensional polygon of FIG. 29 may be a rectangle having a continuous set of markings 320 across the entire surface illustrated in FIG. 29. The user may count markings along an entire length of the rectangle illustrated in FIG. 29 and across an entire width illustrated in FIG. 29 (e.g., the user may count each marking 320 along the length or width or may use references 335 to assist with counting). The user may then multiply the total length dimension by the total width dimension of the two-dimensional rectangle (e.g., multiplying the dimensions of two perpendicular edges) illustrated in FIG. 29 to calculate a surface area of the entire three-dimensional structure illustrated in FIG. 28. A user may also for example add values provided by references 335 that are numerical markings indicating surface area. A user may similarly physically prove the surface area of the three-dimensional structure of system 1000 illustrated in FIG. 30 (e.g., by rearranging the members into the configuration of FIG. 31, and multiplying the length and width of the various rectangles illustrated in FIG. 31), the surface area of the three-dimensional structure of system 1100 illustrated in FIGS. 32A and 32B (e.g., by rearranging the members into the configuration of FIG. 32C, and multiplying the length and width of the various rectangles illustrated in FIG. 32C; and may make similar proofs using system 1150 illustrated in FIGS. 33A, 33B, and 33C), and the surface area of the three-dimensional structure of system 1200 illustrated in FIGS. 34 and 35 (e.g., by rearranging the members into the configuration of FIG. 36, and multiplying the length and width of the various rectangles illustrated in FIG. 36) and of system 1250 illustrated in FIGS. 37A and 37B (e.g., by multiplying the length and width of member 1255 illustrated in FIG. 37B). Also, for example, a user may add together values provided by references 335 that are numerical markings indicating surface area for any of the above embodiments, as disclosed above.

In at least some exemplary embodiments, the exemplary system may be an educational apparatus including one or more first sheet members (e.g., any of the exemplary members disclosed herein) including a first side and a second side, the first side and the second side each having first markings (e.g., as illustrated in FIG. 3) indicating the same first surface area, and one or more first attachment portions disposed along some or substantially all of a perimeter of the one or more first sheet members. The exemplary system may also include one or more second sheet members (e.g., any of the exemplary members disclosed herein) including a first side and a second side, the first side and the second side each having second markings (e.g., as illustrated in FIG. 3) indicating the same second surface area, and one or more second attachment portions disposed along some or substantially all of a perimeter of the one or more second sheet members. For example, the one or more first sheet members and the one or more second sheet members may be configured to be removably attachable to each other in a first arrangement by the one or more first and second attachment portions of the one or more first and second sheet members. Also for example, the one or more first sheet members and the one or more second sheet members may be configured to be removably attachable to each other in a second arrangement, which may be different from the first arrangement, by the one or more first and second attachment portions of the one or more first and second sheet members. Also for example, in at least one of the first and second arrangements, the one or more first sheet members and the one or more second sheet members may be configured to form one or more substantially flat polygons (e.g., as illustrated in many of the exemplary Figures) showing, on a first polygon side, either the first side or the second side of each of the one or more first sheet members and one or more second sheet members.

Also for example, the exemplary system, method, and apparatus may be utilized by a user as a computer-implemented embodiment based on employing the exemplary computer system and/or network components disclosed below relating to FIGS. 38 and 39. For example, any of the exemplary embodiments disclosed herein may be carried out as a computer-implemented embodiment. For example, any of systems 300, 400, 500, 600, 700, 800, 900, 1000, 1100, 1150, 1200, 1250, and/or any other exemplary embodiment may be utilized by a user via a user interface (e.g., computer system including a user interface) such as, for example, a computer touch board (e.g., a classroom smart board), smart phone, tablet, desktop computer, laptop computer, gaming system, and/or virtual reality system including components disclosed relating to FIGS. 38 and 39 or any other suitable computing components or devices. For example, the exemplary members of system 300 illustrated in FIG. 1 may be rendered on a computing device such as a touch board. For example, members 305, 310, and 315 may be rendered as images that may be manipulated by a user of a touch board (e.g., or other computer or e.g., virtual reality system). For example, members 305, 310, and 315 may be touched, picked up, and dragged across the display of a touch board. Also for example, members 305, 310, 315 may be displayed in perspective view, and users may rotate and/or move the exemplary members to replicate physical manipulation of the members. For example, a user may interact with the touch board to manipulate the exemplary members as if they were physical members. For example, displayed members 305, 310, and 315 may include markings 320 and references 335 as disclosed above. Also for example, member properties may be displayed if desired (e.g., an area and/or dimensions of exemplary members) on the exemplary computing device or system. For example, a user may interact with the touch board to manipulate the exemplary members to assemble the exemplary arrangement illustrated in FIG. 5 on the touch board. For example, an operation of the exemplary attachment portions may be replicated during operation of the touch board, allowing users to simulate assembly of the exemplary members into a virtual "three-dimensional shape" that may be illustrated on the touch board. Also for example, a user may take apart the structure illustrated in FIG. 5 by clicking and dragging the exemplary members (e.g., moving and rotating members 305, 310, and 315) across a display of the touch board or other suitable computing system. A user may reassemble the exemplary members on the touch board for example into the arrangement illustrated in FIG. 2 (e.g., by using a virtual reality system, gaming system, or any other suitable computing device). The user may thereby provide evidence that a surface area of the arrangement illustrated in FIG. 5 is equal to an area of the rectangle illustrated in FIG. 2 based on manipulating displayed three-dimensional renderings of the exemplary members as an alternative to physically manipulating tangible exemplary members. It is contemplated that advanced computer systems (e.g., virtual reality systems providing tactile feedback to a user) may closely simulate actually handling physical components for a user. Similar to the exemplary methods disclosed above, the user may use markings 320 and references similar to references 335 to determine an area of the exemplary rectangle illustrated in FIG. 2 that is equal to a surface area of the structure illustrated in FIG. 5. It is also contemplated that the exemplary computing devices (e.g., touch board, computers, gaming systems and/or virtual reality systems) may provide additional information and functionalities to users such as, for example, a wide range of exemplary members including any desired shape and/or assembled structure properties (e.g., area, surface area, volume, dimensions, and/or estimated weight based on assumed materials and size). Also for example, an exemplary computing system embodying the exemplary system may provide printouts (e.g., or three-dimensional printer printed articles) of exemplary members and systems used by a user on a touch board or other computing device. For example, a user may print out a two-dimensional paper copy and/or three-dimensional printed article of any exemplary system to provide further physical proof of educational and/or instructional objectives (e.g., as illustrated in FIGS. 2 and 5).

For example as disclosed above and also below regarding FIGS. 38 and 39, the exemplary system may include an educational instruction module, comprising computer-executable code stored in non-volatile memory, a processor, and a user interface. The educational instruction module, the processor, and the user interface may be configured to display a plurality of exemplary members (e.g., sheet members) on a display of the user interface (e.g., as disclosed above). The plurality of sheet members may include a first side and a second side, the first side and the second side each having markings indicating a surface area of the first and second sides, and one or more attachment portions disposed along some or substantially all of a perimeter of each of the plurality of sheet members. The educational instruction module, the processor, and the user interface may also be configured to receive user input data via the user interface, move the plurality of sheet members on the display of the user interface into a first arrangement based on the user input data, the first arrangement being a three-dimensional rendering of the plurality of sheet members attached via the one or more attachment portions, and move the plurality of sheet members on the display of the user interface into a second arrangement based on the user input data, the second arrangement being a substantially flat polygon showing either the first side or the second side of each of the plurality of sheet members.

Several advantages may be associated with the exemplary disclosed system, method, and apparatus. The exemplary system, method, and apparatus may provide users such as students with a mathematical representation of a complex geometric shape by allowing the users to assemble and take apart geometric structures to determine desired geometric and mathematical properties. The exemplary system, method, and apparatus also allows users to create evidence by use of the exemplary system to physically prove analysis such as mathematical formulas (e.g., proving congruent relationships between shapes and structures). In an educational and/or training setting for example, the exemplary system, method, and apparatus may help students to gain confidence in learning mathematical and geometric concepts by providing physical and easy-to-visualize representations of such concepts, thereby enhancing analytical, exploratory, and cognitive skills of users. The exemplary system, method, and apparatus may also provide teachers, instructors, and trainers with a useful tool for efficiently and effectively demonstrating analytical concepts in a tangible and/or easy-to-visualize manner. The exemplary system, method, and apparatus may also assist tactile learners in developing and improving fine and gross motor skills. The exemplary system and method may additionally help users such as students in learning to represent real world situations as mathematical symbolism to bolster problem-solving and analytical skills.

Figure 38:
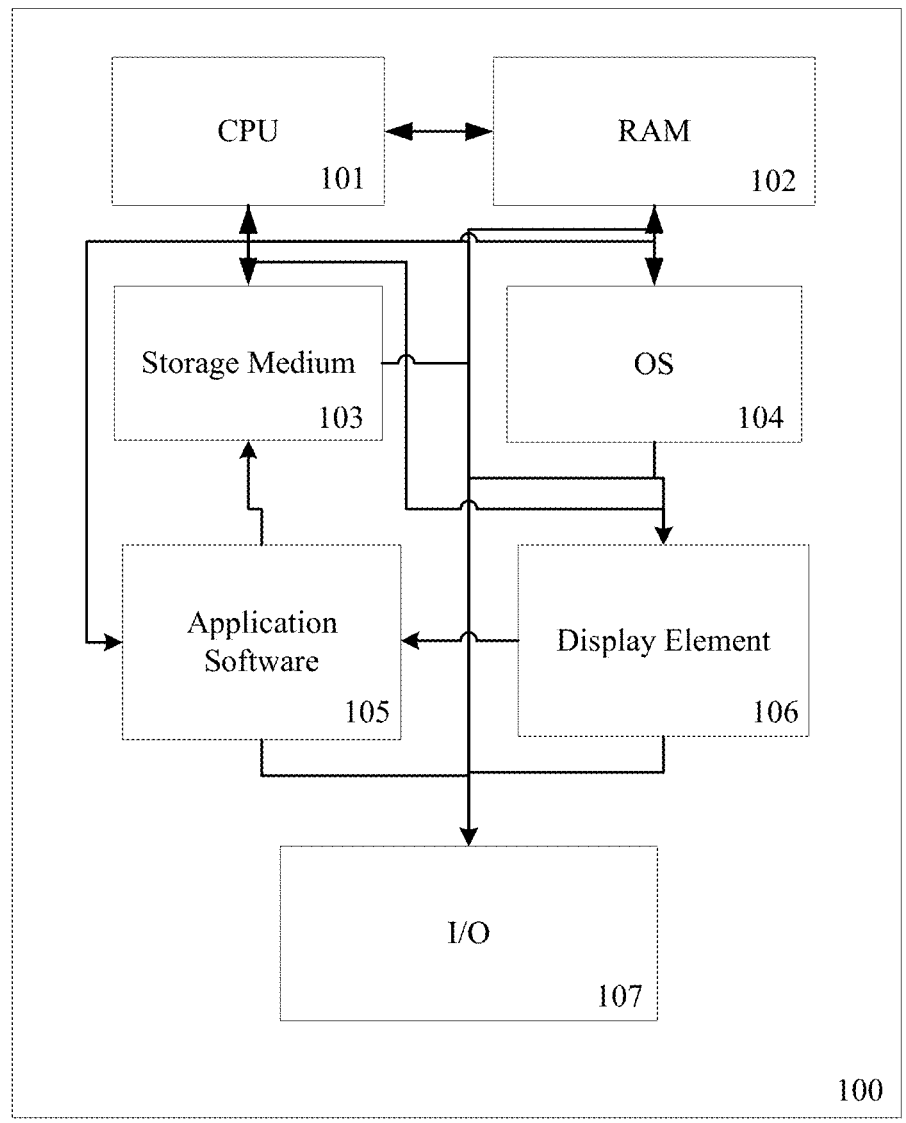
FIG. 38 is a schematic illustration of an exemplary computing device, in accordance with at least some exemplary embodiments of the present disclosure.

An illustrative representation of a computing device appropriate for use with embodiments of the system of the present disclosure is shown in FIG. 38. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 39, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 39:
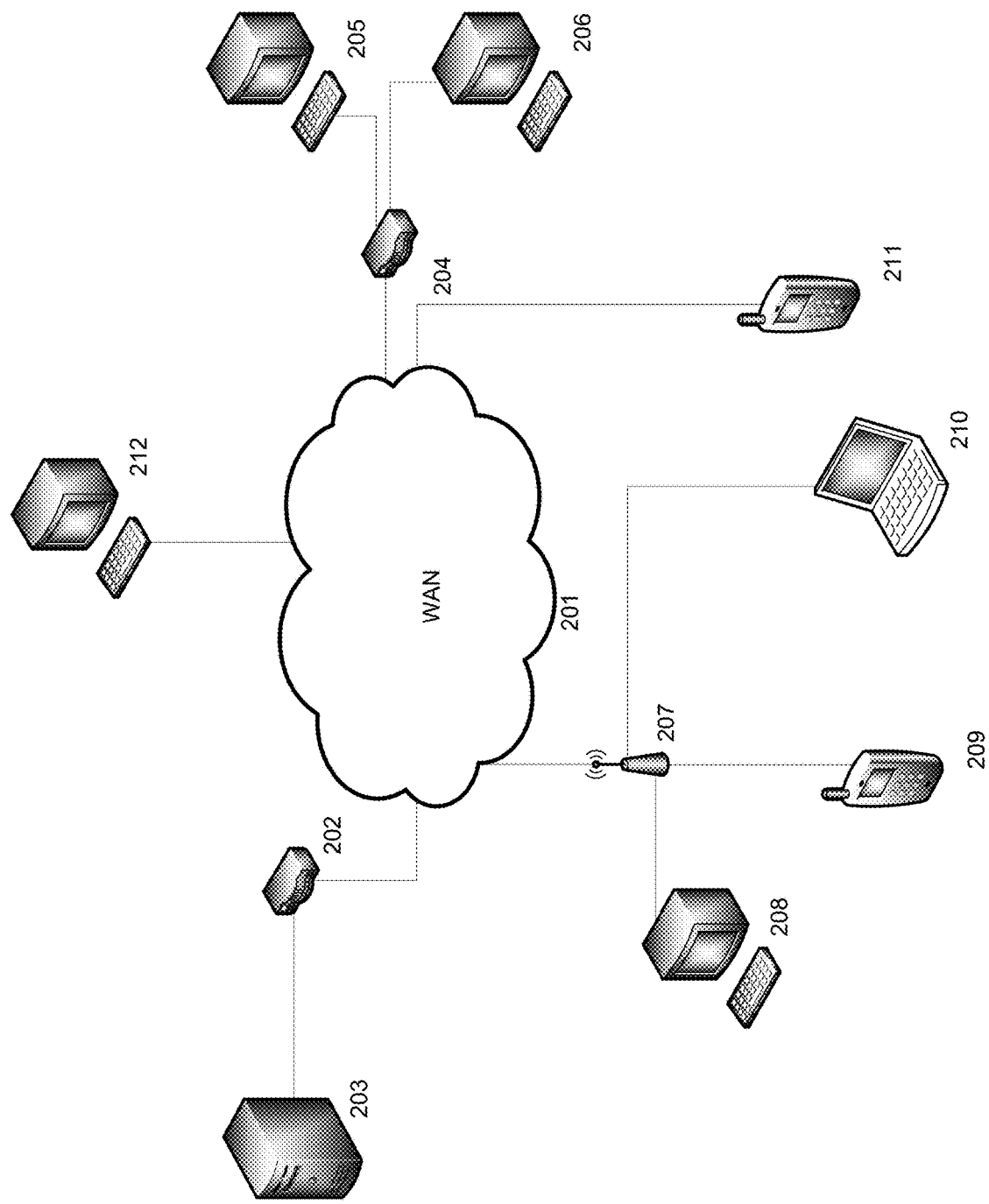
FIG. 39 is a schematic illustration of an exemplary network, in accordance with at least some exemplary embodiments of the present disclosure.

Referring to FIG. 39, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 39, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

While multiple embodiments are disclosed, still other embodiments of the present disclosure will become apparent to those skilled in the art from this detailed description. There may be aspects of this disclosure that may be practiced without the implementation of some features as they are described. It should be understood that some details have not been described in detail in order to not unnecessarily obscure the focus of the disclosure. The disclosure is capable of myriad modifications in various obvious aspects, all without departing from the spirit and scope of the present disclosure. Accordingly, the drawings and descriptions are to be regarded as illustrative rather than restrictive in nature.

What is claimed is:

1. An educational apparatus, comprising:
one or more first sheet members including a first side and a second side, the first side and the second side each having a plurality of first markings that each indicate a first measurement unit, and one or more first attachment portions disposed along some or substantially all of a perimeter of the one or more first sheet members; and
one or more second sheet members including a first side and a second side, the first side and the second side each having a plurality of second markings that each indicate a second measurement unit, and one or more second attachment portions disposed along some or substantially all of a perimeter of the one or more second sheet members;
wherein the one or more first sheet members and the one or more second sheet members are configured to be removably attachable to each other in a first shape by the one or more first and second attachment portions of the one or more first and second sheet members;
wherein the one or more first sheet members and the one or more second sheet members are configured to be removably attachable to each other in a second shape, which is different from the first shape, by the one or more first and second attachment portions of the one or more first and second sheet members;
wherein the first measurement unit is equal to the second measurement unit; and
wherein a first sum of the first measurement units and the second measurement units of the first shape is equal to a second sum of the first measurement units and the second measurement units of the second shape.

2. The educational apparatus of claim 1, wherein, in at least one of the first and second arrangements, the one or more first sheet members and the one or more second sheet members are configured to form a prism.

3. The educational apparatus of claim 1, wherein the educational apparatus is an educational stimulant.

4. The educational apparatus of claim 1, wherein the one or more first sheet members and the one or more second sheet members are tiles.

5. The educational apparatus of claim 1, wherein the one or more first attachment portions and the one or more second attachment portions are magnetic attachment portions.

6. The educational apparatus of claim 1, wherein the one or more first sheet members and the one or more second sheet members are substantially rigid members or substantially flexible members.

7. The educational apparatus of claim 1, wherein:
the first measurement unit and the second measurement unit that are equal to each other are each a surface area unit;
the first sum and the second sum that are equal to each other are each a surface area sum; and
each of the plurality of first markings and the plurality of second markings is one of a square having a surface area equal to the surface area unit or a triangle having a surface area equal to one-half of the surface area unit.

8. The educational apparatus of claim 7, wherein the first shape is a parallelogram and the second shape is a triangle, the parallelogram and the triangle each including a total amount of first and second markings equal to the surface area sum.

9. The educational apparatus of claim 7, wherein the first shape is a kite shape and the second shape is a square, the kite shape and the square each including a total amount of first and second markings equal to the surface area sum.

10. The educational apparatus of claim 7, wherein the first shape is a rectangle and the second shape is a triangle, the rectangle and the triangle each including a total amount of first and second markings equal to the surface area sum.

11. The educational apparatus of claim 7, wherein the first shape is a rhombus and the second shape is a triangle, the rhombus and the triangle each including a total amount of first and second markings equal to the surface area sum.

12. The educational apparatus of claim 1, wherein the plurality of first markings and the plurality of second markings include either a plurality of gridlines measuring surface area or a numerical marking indicating surface area.

13. The educational apparatus of claim 12, wherein:
the educational apparatus is an educational stimulant; and
the plurality of gridlines measuring surface area are marked by unit markings indicating length.

14. A method, comprising:
providing one or more first sheet members including a first side and a second side, the first side and the second side each having a plurality of first markings that each indicate a first measurement unit, and one or more first attachment portions disposed along some or substantially all of a perimeter of the one or more first sheet members;
providing one or more second sheet members including a first side and a second side, the first side and the second side each having a plurality of second markings that each indicate a second measurement unit, and one or more second attachment portions disposed along some or substantially all of a perimeter of the one or more second sheet members;
removably attaching the one or more first sheet members and the one or more second sheet members, via the one or more first and second attachment portions of the one or more first and second sheet members, to form a first shape;
removably attaching the one or more first sheet members and the one or more second sheet members, via the one or more first and second attachment portions of the one or more first and second sheet members, to form a second shape, which is different from the first shape;
summing the first measurement units and the second measurement units of the first shape to determine a first sum; and
summing the first measurement units and the second measurement units of the second shape to determine a second sum;
wherein the first measurement unit is equal to the second measurement unit; and
wherein the first sum of the first shape is equal to the second sum of the second shape.

15. The method of claim 14, wherein:
the first measurement unit and the second measurement unit that are equal to each other are each a surface area unit; and
the first sum and the second sum that are equal to each other are each a surface area sum.

16. The method of claim 14, wherein each of the plurality of first markings and the plurality of second markings is one of a square having a surface area equal to the surface area unit or a triangle having a surface area equal to one-half of the surface area unit.

17. The method of claim 16, wherein summing the first measurement units and the second measurement units of the first and second shapes includes adding the squares and the triangles of the plurality of first markings and the plurality of second markings.

18. An educational apparatus, comprising:
one or more first sheet members including a first side and a second side, the first side or the second side having a plurality of first markings that each indicate a first surface area unit, and one or more first attachment portions disposed along some or substantially all of a perimeter of the one or more first sheet members; and
one or more second sheet members including a first side and a second side, the first side or the second side having a plurality of second markings that each indicate a second surface area unit, and one or more second attachment portions disposed along some or substantially all of a perimeter of the one or more second sheet members;
wherein the one or more first sheet members and the one or more second sheet members are configured to be removably attachable to each other in a first shape by the one or more first and second attachment portions of the one or more first and second sheet members;
wherein the one or more first sheet members and the one or more second sheet members are configured to be removably attachable to each other in a second shape, which is different from the first shape, by the one or more first and second attachment portions of the one or more first and second sheet members;
wherein the first surface area unit is equal to the second surface area unit;
wherein a first sum of the first surface area units and the second surface area units of the first shape is equal to a second sum of the first surface area units and the second surface area units of the second shape; and
wherein each of the plurality of first markings and the plurality of second markings is one of a square having a surface area equal to the surface area unit or a triangle having a surface area equal to one-half of the surface area unit.

19. The educational apparatus of claim 18, wherein:
the first sum and the second sum that are equal to each other are each a surface area sum; and
the first shape is a parallelogram and the second shape is a kite shape, the parallelogram and the kite shape each including a total amount of first and second markings equal to the surface area sum.

20. The educational apparatus of claim 18, wherein:
the first sum and the second sum that are equal to each other are each a surface area sum; and
the first shape is a parallelogram and the second shape is a trapezoid, the parallelogram and the trapezoid each including a total amount of first and second markings equal to the surface area sum.

\* \* \* \* \*